United States Patent
Wu

(10) Patent No.: US 6,427,200 B1
(45) Date of Patent: Jul. 30, 2002

(54) MULTIPLE CHANGEABLE ADDRESSING MAPPING CIRCUIT

(75) Inventor: Muh Wu, Taiwan (TW)

(73) Assignee: Institute for Information Industry, Taipei (TW)

( * ) Notice: Subject to any disclaimer, the term of this patent is extended or adjusted under 35 U.S.C. 154(b) by 71 days.

(21) Appl. No.: 09/670,554

(22) Filed: Sep. 27, 2000

(51) Int. Cl.[7] .............................................. G06F 12/10
(52) U.S. Cl. ...................................... 711/220; 711/200
(58) Field of Search ................................. 711/200, 220

(56) References Cited

U.S. PATENT DOCUMENTS

| | | | | |
|---|---|---|---|---|
| 4,570,236 A | * | 2/1986 | Rebel et al. ................. | 711/220 |
| 5,293,596 A | * | 3/1994 | Toyokura et al. ........... | 711/220 |
| 5,699,545 A | * | 12/1997 | Kuwanoe et al. ........... | 711/220 |
| 5,765,218 A | * | 6/1998 | Ozawa et al. ............... | 711/220 |
| 5,860,154 A | * | 1/1999 | Abramson et al. .......... | 711/220 |
| 5,918,253 A | * | 6/1999 | Kadowaki .................... | 711/220 |
| 5,940,876 A | * | 8/1999 | Pickett ......................... | 711/220 |

* cited by examiner

*Primary Examiner*—Do Hyun Yoo
*Assistant Examiner*—Paul Baker
(74) *Attorney, Agent, or Firm*—Bacon & Thomas

(57) ABSTRACT

A multiple changeable addressing mapping circuit is disclosed for converting an input logic address of a field array in a data array into an output physical address. The circuit has multiple address mappers for process the conversion between the input logical address and the output physical address. The circuit also has a mapper selector for selecting an address mapper to output physical address. The circuit further has a control and interface circuit for setting the registers in the address mapper, and controlling the address mapper and mapper selector.

6 Claims, 5 Drawing Sheets

MULTIPLE CHANGEABLE ADDRESSING MAPPING CIRCUIT

BACKGROUND OF THE INVENTION

1. Field of the Invention

The present invention relates to an addressing mapping circuit and, more particularly, to such a circuit capable of reducing the addressing operation by software in processing the structural and non-continuous addressing mapping.

2. Description of Related Art

Currently, the memory or peripheral device is accessed by a processor with a single fixed addressing mapping technique. That is, in designing hardware circuit, the accessable address of memory or peripheral is fixed. Some circuit utilizes incomplete decoding technique for decoding part of the address lines, such that peripheral or memory of the same type can correspond to different addresses. However, with such a technique, the data arrangements in different addresses are the same.

Some embedded CPUs have built-in address decoding circuit, which can be programmed to address the memory or peripheral. However, the accessed addresses are continuous.

As to the structural and non-continuous addressing mapping, software program is generally employed for the address manipulation in the conventional skill. Such a software manipulation usually requires to process the array data structure, which may greatly increase the loading of the processor. Therefore, there is a need for the above conventional addressing techniques to be improved.

SUMMARY OF THE INVENTION

One object of the present invention is to provide a multiple changeable addressing mapping circuit, which can process structural and non-continuous data by hardware, instead of a large amount software addressing operation.

Another object of the present invention is to provide a multiple changeable addressing mapping circuit which can increase the portability of program.

A further object of the present invention is to provide a multiple changeable addressing mapping circuit, which has a plurality of registers for determining the mapping functions.

According to one aspect, the present invention which achieves these objects relates to a multiple changeable addressing mapping circuit for converting an input logic address of a field array in a data array into an output physical address. The circuit comprises: at least an address mapper for process the conversion between the input logical address and the output physical address; a mapper selector for selecting an address mapper to output physical address; and a control and interface circuit for setting the base shift register, logical base register, field length register and recording length register, and controlling the address mapper and mapper selector. The address mapper comprises: a base shift register for recording a starting physical address of the field array to be mapped; a logical base register for recording a starting logical address of the field array to be mapped; a field length register for recording the length of a field; a recording length register for recording the length of the array; a subtracter for subtracting the input logic address from a logical base address stored in the logical base register; a division/remainder generator for dividing output value of the subtracter by a field length stored in the field length register 23; a multiplier for multiplying the array length of the record length register by a quotient of the division/remainder generator; and an adder for adding a starting physical address stored in the base shift register, a remainder of the division/remainder generator and an output value of the multiplier together to have an output physical address.

According to another aspect, the present invention which achieves these objects relates to a multiple changeable addressing mapping circuit for converting an input logic address of a field array in a data array into an output physical address. The circuit comprises: at least an address mapper for process the conversion between the input logical address and the output physical address; a mapper selector for selecting an address mapper to output physical address; and a control and interface circuit for setting the base shift register, field length register and recording length register, and controlling the address mapper and mapper selector. The address mapper comprises: a base shift register for recording a starting physical address of the field array to be mapped; a field length register for recording the length of a field; a recording length register for recording the length of the array; a division/remainder generator for dividing the input logic address by a field length stored in the field length register 23; a multiplier for multiplying the array length of the record length register by a quotient of the division/remainder generator; and an adder for adding a starting physical address stored in the base shift register, a remainder of the division/remainder generator and an output value of the multiplier together to have an output physical address.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
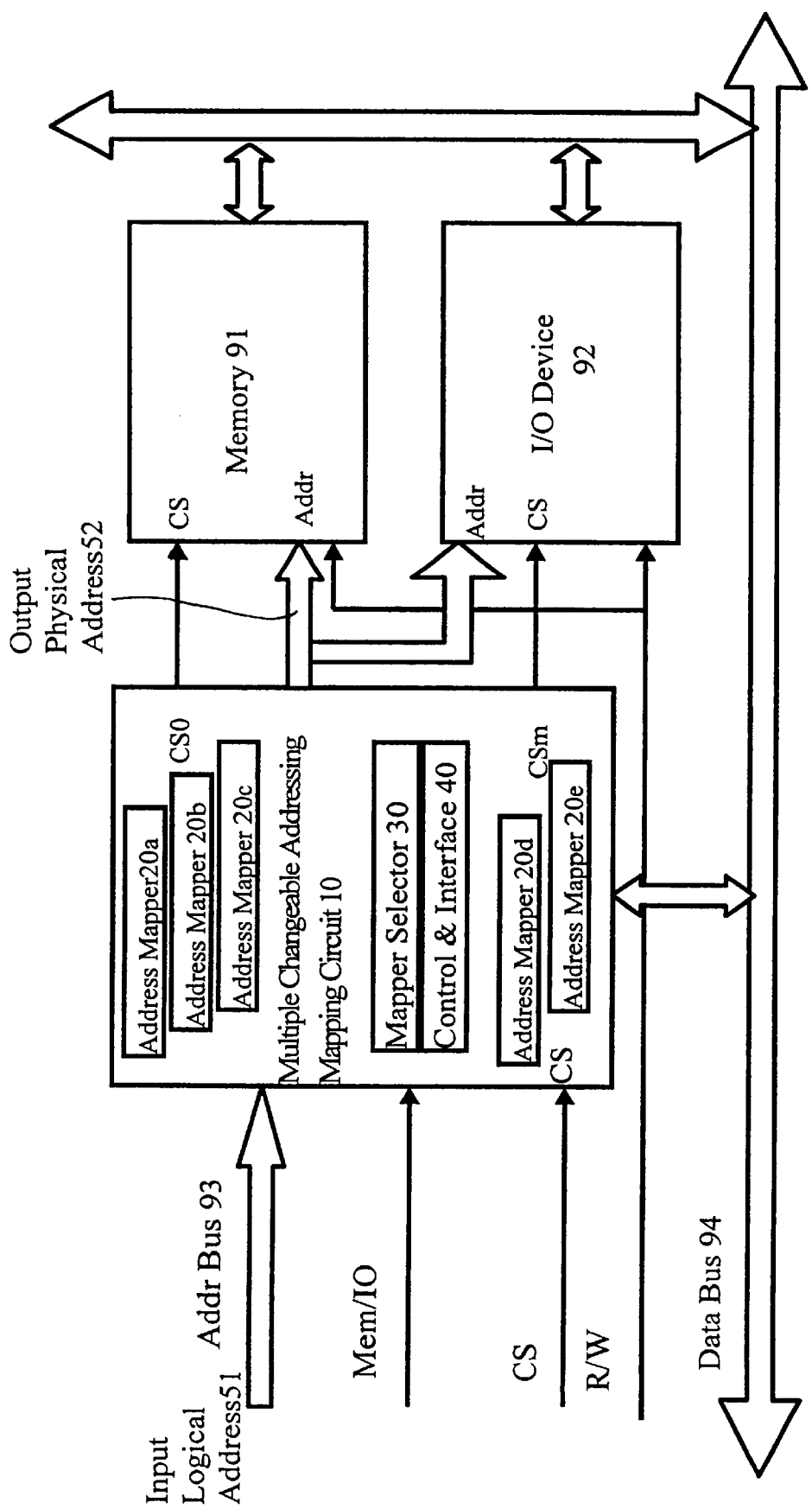
FIG. 1 is a block diagram of the multiple changeable addressing mapping circuit in accordance with the present invention.

With reference to FIG. 1, there is shown a block diagram of the multiple changeable addressing mapping circuit 10 in accordance with the preferred embodiment of the present invention.

From the view point of the multiple changeable addressing mapping circuit 10, the input logical address 51 is the address identified by a processor of the computer or logical address bus 93 of the motherboard. The multiple changeable addressing mapping circuit 10 converts the input logical address 51 to produce the output physical address 52, which is the actual address signal sent to the memory 91 or I/O device 92. The relation between the input logical address 51 and output physical address 52 is changeable and can be of continuous or non-continuous correspondence. As shown in FIG. 1, there are five address mappers 20a, 20b, 20c, 20d and 20e, and each address mapper 20 can be set to have its own mapping function for mapping the input logical address 51 to the output physical address 52. Assuming that the output physical address 52 including 4000, 4008, 4016, 4024, 4032, etc., has to correspond to the logical address 0, 1, 2, 3,4, 5, etc., the address mappers 20a can be set as follows:

Address Mapper 20a: PA=F1(LA), F1(x)=4000+(x)* 8.

Moreover, the mapper selector 30 is set so that the chip select CS0 is corresponding to the address mapper 20a. Therefore, when the processor issues the input logical address 0, 1, 2, 3, etc. to access memory, the actual memory locations that are accessed are at the output physical address 4000, 4008, 4016, 4024, 4032, etc.

As to the memory 91 or I/O device 92, there are multiple kinds of relations between the logical address (or known as virtual address) and physical address, which is referred to a multi-addressing function, and each addressing scheme can be different from another. With reference to FIG. 1, the logical address bus 93 of the external processor can be converted into the physical address of the memory to access memory data through three different mapping functions of the three address mapper 20a, 20b and 20c of the multiple changeable addressing mapping circuit 10, respectively, while the other two address mappers 20d and 20e are used by the I/O device 92. The address mappers 20a, 20b and 20c are set as follows:

Address Mapper 20a: PA=F1(LA),

Address Mapper 20b: PA=F2(LA), and

Address Mapper 20c: PA=LA, where F1 and F2 are different mapping functions, and address mapper 20c doesn't perform any conversion.

By setting different mapping functions, the memory 91 can be mapped to a desired address range of the I/O device 92, or the I/O device 92 can be mapped to a desired address range of the memory 91.

Therefore, by employing address space mapping, different address spaces can be mapped with the use of different mappers; for example, addresses 0000-3fff are mapped automatically using the address mapper 20a, addresses 4000-BFFF are not mapped, addresses C000-DFFF are mapped using the address mapper 20b, and addresses F000-FFFF are mapped using address mapper 20c.

The aforementioned mapping conversion between logical addresses and physical addresses is accomplished by hardware, thereby saving a large amount of software operations and access time. For example, when processing structural and non-continuous data, the hardware addressing mapping circuit is used, instead of the large amount of software address operations. In order to access that data in the addresses, for example, 4000, 4008, 4016, 4024, 4032, etc., a simple address conversion function can be used, which is described as follows:

F1(x)=4000+(x)*8.

If the address is calculated by software, there is a need to have one multiplication or shift operation and one addition operation to accomplish the conversion function. Taking the 80×86 assembly language as an example, the software instruction codes required for performing one memory access are as follows:

MOV BX, x

SHL BX,3 ;Multiply 8

ADD BX, 4000

MOV AX, [BX]

If the conversion function is getting more complicated, the number of instruction codes to be executed becomes tremendous. However, when using the circuit in accordance with the present invention to perform the memory access, only a small amount of instructions has to be executed after the address mapper is set. These instructions are listed as follows:

MOV BX,x

MOV AX,[BX]

If a more complicated function is employed, for example, to access 3 continuous addresses for every 20 addresses, the circuit in accordance with the present invention can also be used to accomplish the memory access operation, so as to save much time in using a loop to access a large amount of data.

Furthermore, the use of the circuit in accordance with the present invention can also increase the portability of program. Because the physical address can be mapped to logical address, a programmer can design the main system programs based on the logical address. As such, it is only required to determine the mapping function of the address mapper 20 in initialization stage. Therefore, program can be transferred to different computer platforms rapidly.

Figures 2, 5:
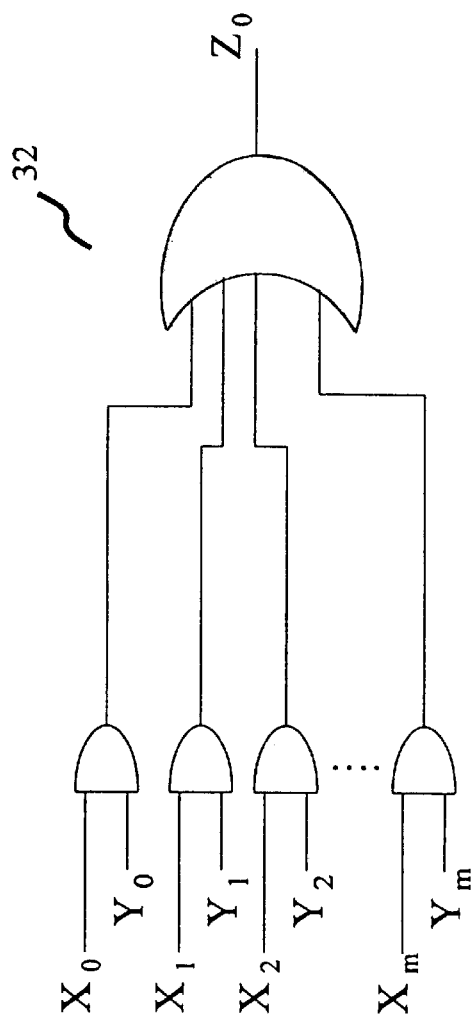
FIG. 2 is an example showing an application for data accessing in arrays in accordance with the present invention.
FIG. 5 is a schematic diagram of the mask OR circuit in accordance with the present invention.

To depict the advantages and features of the circuit in accordance with the present invention, FIG. 2 gives an example showing an application for data accessing in arrays. In this example, the data in the 'Name A' field of table A is intended to be read out to store in the 'Custom B' field of table B.

As shown, the multi-field table A is located at an address starting from 4000h. The table A has three fields whose title and length are 'No A' and 4 bytes, 'Name A' and 16 bytes, and 'NID A' and 8 bytes, respectively. In addition, there is a table B with 2 fields located at an address starting from 6000h. The table B has two fields whose title and length are 'SID B' and 4 bytes, and 'Custom B' and 16 bytes, respectively.

The starting address of each 'Name A' can be expressed as: 4000h+4+(1Ch*i), i=0,1,2, . . . (i is the row number). Therefore, the starting addresses of the 'Name A' are 4004h, 4020h, 403Ch, 4058h, etc.

The starting address of each 'Custom B' can be expressed as: 6000h+4+(14Ch*j), j=0,1,2, . . . (0 is the row number). Therefore, the starting addresses of the 'Custom B' are 6004h, 6018h, 602Ch, 6040h, etc.

The starting address and field width of any field of each table can be expressed by the following formula:

Addr$_{13}$start=Base+FieldOffset+n*RecordLen=(Base+FieldOffset)+n*RecordLen, where the parameters are defined as follows:
Base: starting address of the table, such as 4000h for table A and 6000h for table B;
FieldOffset: offset value of the field of a field in the row of the table, wherein the offsets for the fields in the table A and table B are:
'No A': 0, 'Name A': 4, 'NID A': 14h
'SID B': 0, 'Custom B': 4;

RecordLen: length of each row of data (1Ch for tableA, and 14h for table B)

If all the data in the addresses of the fields are accessed in continuous manner, the formula can be modified as follows:

$$S[x]=(Base+FieldOffset)+INT(x/FieldLen)*RecordLen+(x \mod FieldLen), \quad (1)$$

wherein:

x is the offset value for the data in the logical array S;

FieldLen represents the field length, and each field's FieldLen is as follows:

'No A': 4, 'Name A': 10h, 'NID A': 8, 'SID B': 4, 'Custom B': 10h.

Assuming table A has n rows of data and the field is copied by software in the conventional skill, the required virtual program codes are as follows:

char *ptrA, *ptrB;
unsigned long tempA, tempB, count, x, n;
tempA =Base(TableA) + FieldOffset(NameA);
tempB =Base(TableB) + FieldOffset(CustomB);
count = n * FieldLen(NameA);
for (x =0; x < count; x++)
{ ptrA=(char *)(tempA + (int)(x / FieldLen(NameA)) * RecordLen(TableA) + (x % FieldLen(NameA)));
ptrB=(char *)(tempB + (int)(x / FieldLen(CustomB)) * RecordLen(TableB) + (x % FieldLen(CustomB)));
*ptrBn = *ptrA;
}

If the underlined portion the above program codes can be calculated by hardware, the for-loop program can be simplified as follows:

. . .
ptrA = VbaseA; // VbaseA is the starting logical address of field NameA.
ptrB = VbaseB; // VbaseA is the initial logical address of field CustomB.
count = n * FieldLen(NameA);
for (x=0; x < count; x++)
{ *ptrB++ = *ptrA++
}

Figure 3:
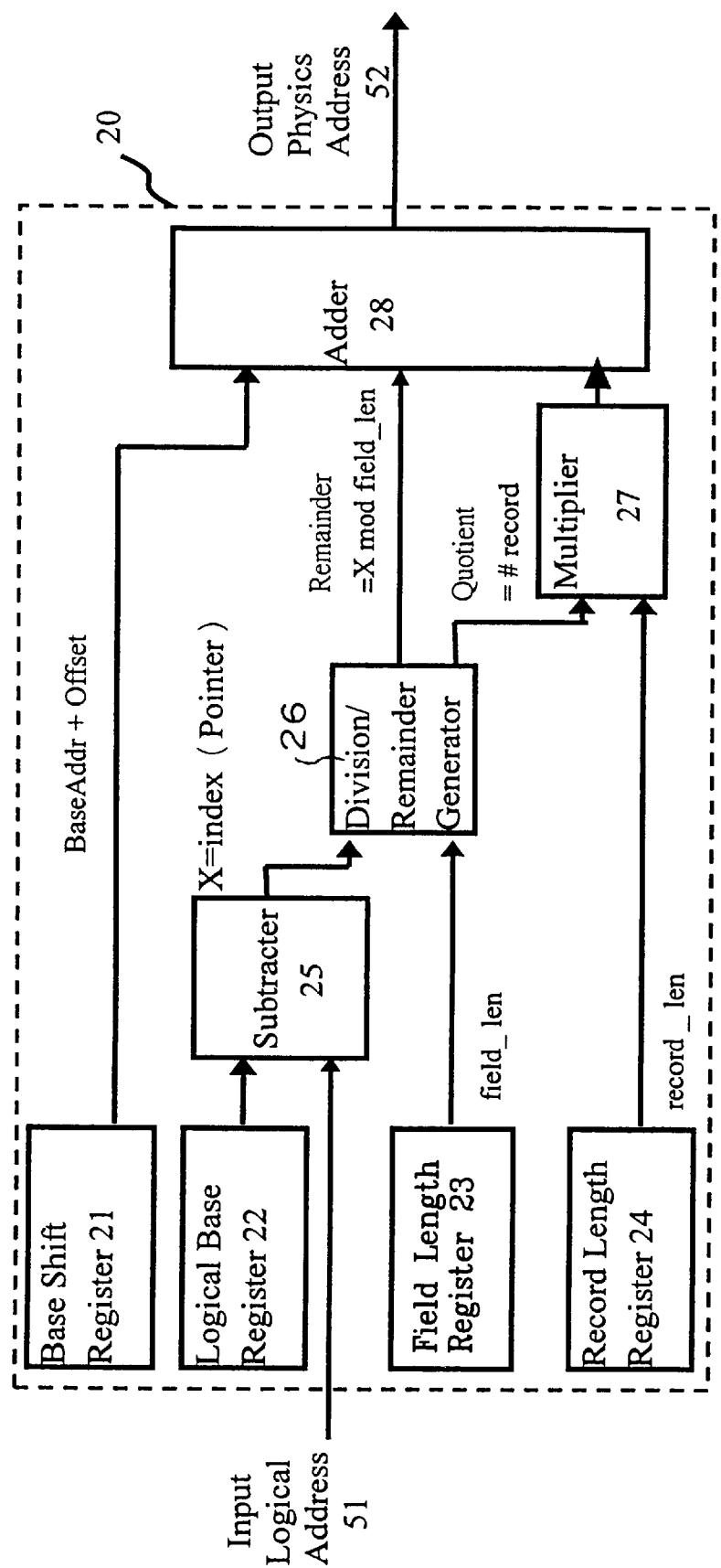
FIG. 3 is a block diagram of the address mapper in accordance with the present invention.

Therefore, the present invention utilizes such a hardware solution to achieve a rapid operation, particularly in accessing the non-continuous array data. To achieve the purposes of the above examples, FIG. 3 details the structure of the address mapper 20, which performs the function of formula (1):

$$S[x]=(Base+FieldOffset)+INT(x/FieldLen)*RecordLen+(x \mod FieldLen),$$

wherein x is the offset value for the data in the logical array S, for example, the 'Name A' field array of table A, so that x can be provided as an array pointer; and S[x] is the output physical address 52.

The input logical address 51 of logical array S is expressed by Sbase+x, wherein 'Sbase' represents a starting logical address of the field array to be mapped. Therefore, the 'x' can be calculated; i.e., x = input logical address— Sbase.

The address mapper 20 stores related parameters with the use of the following registers:

Base Shift Register 21: recording the starting physical address of the field array to be mapped, i.e. the value of 'Base+FieldOffset' or 4000h+4=4004h for the above embodiment;

Logical Base Register 22: recording the starting logical address of the field array to be mapped, i.e. the value of 'Sbase' which may be set to C000h or 0, depending on whether the input address line is of complete address line C000h or contains a low-bit address portion (if the logical address array has an starting address from 0000 or the effective low-bit address is 0, for example the starting address of logic array is C0000h so that the input address is 0 because only 12 low-bit address lines are used, the logical base register22 and subtracter 25 are not required in the circuit.

Field Length Register 23: recording the length of the field; i.e. the value of the 'FieldLength' which is 10h in the above embodiment; and Recording Length Register 24: recording the length of the array; i.e. the value of 'RecordLen' which is 1Ch in the above embodiment.

The address mapper 20 can be implemented by the following math processors:

Subtracter 25: subtracting the logical base address stored in the logical base register 22 from the input logic address 51; i.e. determining array pointer x = Input Logical Address 51–Sbase (for example, Input Logical Address 51 is C004h, and x C004h–C000h = 4);

Division/remainder generator 26: dividing the output value of the subtracter 25 by the field length stored in the field length register 23; i.e. determining the quotient value of INT (x/FieldLen) and the remainder value of x mod FieldLen (for example, quotient is 1 and the remainder is 2 when x=12h);

Multiplier 27: multiplying the array length of the record length register 24 by the quotient of the division/remainder generator 26; i.e. determining the value of INT (x/FieldLen) * RecordLen (for example, the quotient is 1 and the output of the multiplier is 1Ch when x=12h); and Adder 28: adding the starting physical address stored in the base shift register 21, remainder of the division/remainder generator 26 a and output value of the multiplier 27 together to have an output physical address 52; i.e., determining S[x] (for example, the output physical address52 is 4022h when the input logical address51 is C012h).

In view of the foregoing, it is known that, once a logical address is entered, the circuit can output the corresponding physical address. In the range of the logical address, the processor can access memory continuously or randomly without the need of complicated software address manipulation. Furthermore, the mapping function can be changed by simply modifying the content of the base shift register 21, the logical base register 22, the field length register 23 and the record length register 24.

In the embodiment shown in FIG. 2 it is preferred to have two address mapper 20 for determining the physical address of the 'Name A' field of table A and the physical address of the 'Custom B' field of table B, respectively.

Figure 4:
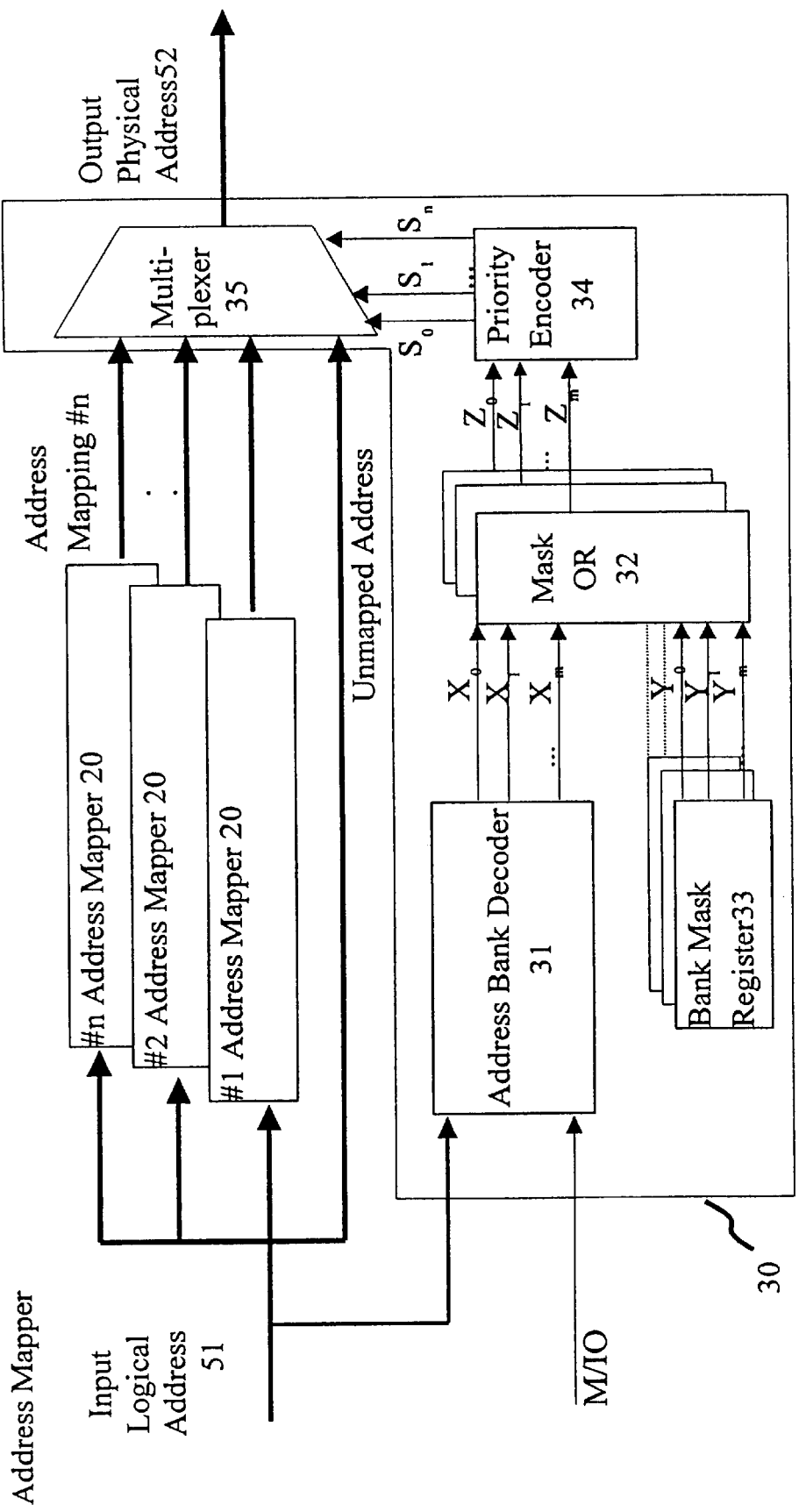
FIG. 4 is a block diagram of the mapper selector in accordance with the present invention.

FIG. 4 is the block diagram of the mapper selector 30, which is provided for decoding the bank address (i.e., the high-bit address of the input logical address51) via the address decoder 31. Based on the decoding result and the content of the bank mask register 33, the address mapper 20 to be used is selected. As shown in the block diagram, the bank address is decoded via an address bank decoder 31, wherein $X_0$~$Xm$ represent different decoding ranges, for example, the decoding to 0000-0fff makes $X_0$ to be 1 and $X_1$~$Xm$ to be 0, and the decoding to 1000-1fff makes $X_0$ to be 1 and the others to be 0. These addresses will be sent to multiple mask OR circuits 32, which perform OR operations on the outputs form logical AND operations on the corresponding bytes of the content of the bank mask register 33 and the output of the address decoder 31, so as to control which decoded bank address can be sent to the Z's outputs. For example, by setting $Y_0$, $Y_1$ and $Y_2$ of the bank mask register 33 to be 1, and $Y_3 \sim Y_m$, to be 0, the three address decoding ranges of $X_0$, $X_1$, and $X_2$, are valid, and the others are invalid. If the address range is in any one of the $X_0$, $X_1$, and $X_2$, the output of Z will be 1; otherwise, it will be 0. The schematic diagram of the mask OR circuit is given in FIG. 5. Each address mapper 20 has a bank mask register 33 and a mask OR circuit 32. If the circuit has three address mappers 20, there are three bank mask registers 33 and three mask OR circuits 32.

The output of each mask OR circuit 32 is sent to a priority encoder 34 for performing a priority encoding. For example, if the output of Z2 is 1 and the other inputs are 0, the output of the priority decoder is 2. If more than two inputs are 1 at the same time, the decoding and output sequence is based on the priority.

The multiplexer 35 is provided to determine the selected address mapper 20 based on the output of the priority decoder, so as to output the physical mapping address of the mapper.

When the output of the priority encoder 34 is 0, the output address is the same as the input address, and the circuit doesn't perform any address mapping operation.

Figure 6:
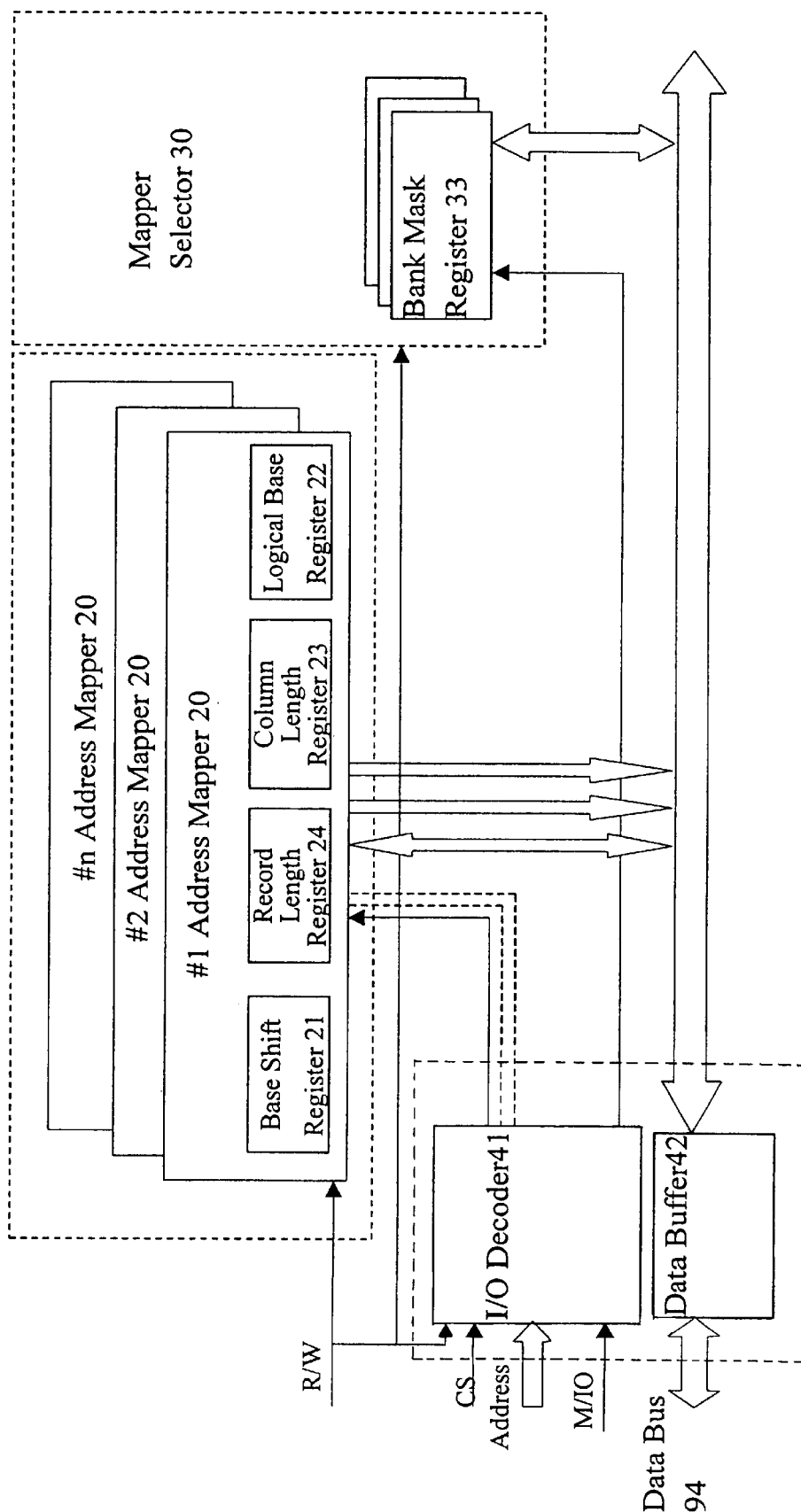
FIG. 6 is a block diagram of the control and interface circuit in accordance with the present invention.

FIG. 6 illustrates the implementation of control and interface circuit 40 of the present invention, which is provided to set and access the data of the registers in the address mapper 20 and the mapper selector 30. The I/O decoder 14 is used to decode the address of each register for accessing data. The data buffer 42 is provided to store the data in the external data bus 94 into the registers or send the data in the registers to the external data bus 94.

Although the present invention has been explained in relation to its preferred embodiment, it is to be understood that many other possible modifications and variations can be made without departing from the spirit and scope of the invention as hereinafter claimed.

What is claimed is:

1. A multiple changeable addressing mapping circuit for converting an input logic address of a field array in a data array into an output physical address, the circuit comprising:
   at least an address mapper for processing the conversion between the input logical address and the output physical address, wherein the address mapper comprises:
   a base shift register for recording a starting physical address of the field array to be mapped;
   a logical base register for recording a starting logical address of the field array to be mapped;
   a field length register for recording the length of a field;
   a recording length register for recording the length of the array;
   a subtracter for subtracting a logical base address stored in the logical base register from the input logic address;
   a division/remainder generator for dividing output value of the subtracter by a field length stored in the field length register;
   a multiplier for multiplying the array length of the record length register by a quotient of the division/remainder generator; and
   an adder for adding a starting physical address stored in the base shift register, a remainder of the division/remainder generator and an output value of the multiplier together to have an output physical address;
   a mapper selector for selecting an address mapper to output physical address; and
   a control and interface circuit for setting the base shift register, logical base register, field length register and recording length register, and controlling the address mapper and mapper selector.

2. The multiple changeable addressing mapping circuit as claimed in claim 1, wherein there are a plurality of address mappers.

3. The multiple changeable addressing mapping circuit as claimed in claim 1, wherein the control and interface circuit comprises an I/O decoder for decoding the addresses of the base shift register, logical base register, field length register and recording length register, so as to access data.

4. A multiple changeable addressing mapping circuit for converting an input logic address of a field array in a data array into an output physical address, the circuit comprising:
   at least an address mapper for processing the conversion between the input logical address and the output physical address, wherein the address mapper comprises:
   a base shift register for recording a starting physical address of the field array to be mapped;
   a field length register for recording the length of a field;
   a recording length register for recording the length of the array;
   a division/remainder generator for dividing the input logic address by a field length stored in the field length register;
   a multiplier for multiplying the array length of the record length register by a quotient of the division/remainder generator; and
   an adder for adding a starting physical address stored in the base shift register, a remainder of the division/remainder generator and an output value of the multiplier together to have an output physical address;
   a mapper selector for selecting an address mapper to output physical address; and
   a control and interface circuit for setting the base shift register, field length register and recording length register, and controlling the address mapper and mapper selector.

5. The multiple changeable addressing mapping circuit as claimed in claim 4, wherein there are a plurality of address mappers.

6. The multiple changeable addressing mapping circuit as claimed in claim 4, wherein the control and interface circuit comprises an I/O decoder for decoding the addresses of the base shift register, field length register and recording length register, so as to access data.

* * * * *